(12) United States Patent
Rich et al.

(10) Patent No.: US 12,207,761 B2
(45) Date of Patent: Jan. 28, 2025

(54) TRANSPORTABLE BARBECUE GRILL

(71) Applicants: Daniel L. Rich, Rochester, WA (US); Danil C. Klug, Rochester, WA (US); Daniel Fagerness, Rochester, WA (US)

(72) Inventors: Daniel L. Rich, Rochester, WA (US); Danil C. Klug, Rochester, WA (US); Daniel Fagerness, Rochester, WA (US)

(73) Assignee: Yipe Media, LLC, Rochester, WA (US)

( * ) Notice: Subject to any disclaimer, the term of this patent is extended or adjusted under 35 U.S.C. 154(b) by 419 days.

(21) Appl. No.: 17/832,530

(22) Filed: Jun. 3, 2022

(65) Prior Publication Data
US 2023/0389752 A1 Dec. 7, 2023

(51) Int. Cl.
*A47J 37/07* (2006.01)

(52) U.S. Cl.
CPC ....... *A47J 37/0763* (2013.01); *A47J 37/0713* (2013.01)

(58) Field of Classification Search
CPC .................. A47J 37/0763; A47J 37/0713
USPC ............................. 126/9 R, 30, 25 R
See application file for complete search history.

(56) References Cited

U.S. PATENT DOCUMENTS

| | | | | |
|---|---|---|---|---|
| 3,630,188 A | * | 12/1971 | Ross | A47J 37/0704 126/506 |
| 2006/0021521 A1 | * | 2/2006 | Cutrer | A47J 37/0713 99/516 |
| 2012/0204864 A1 | * | 8/2012 | Reimelt | A47J 37/0704 126/9 R |

* cited by examiner

Primary Examiner — Vivek K Shirsat

(57) ABSTRACT

A barbecue grill shaped to be received by a bucket of a front loader of a tractor for hauling and transport of the barbecue grill.

13 Claims, 10 Drawing Sheets

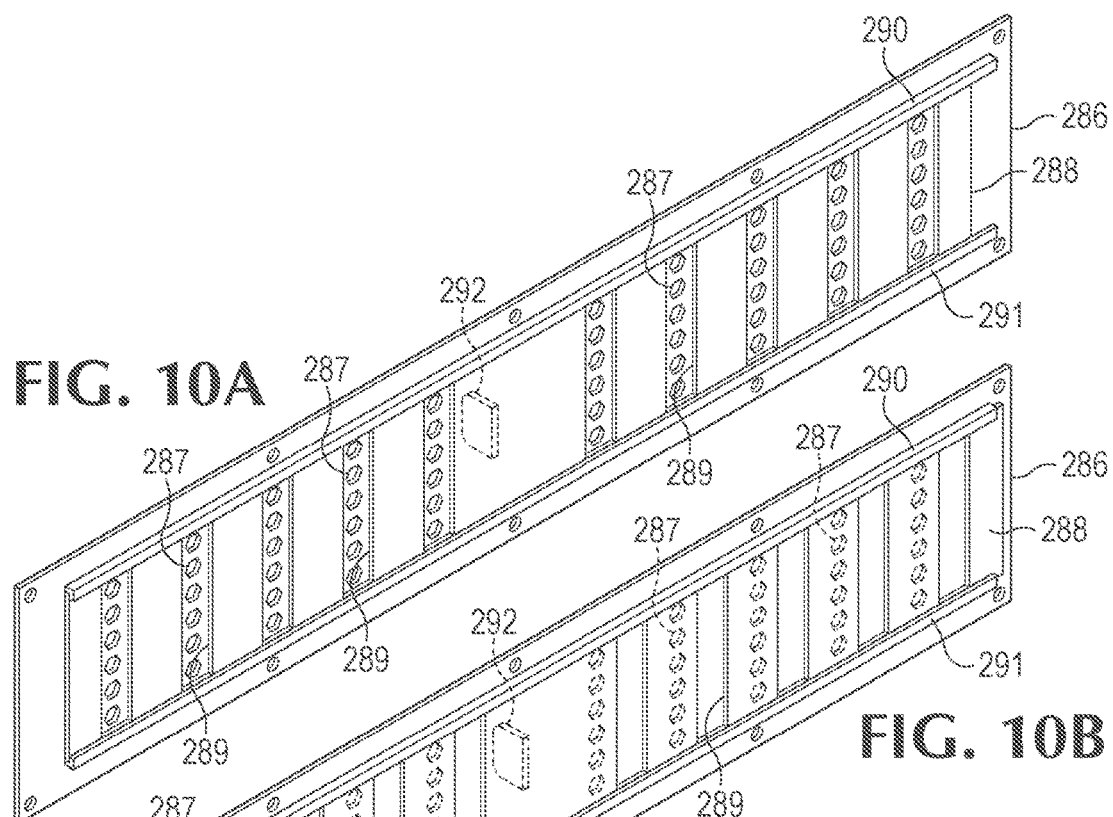
FIG. 10A
FIG. 10B
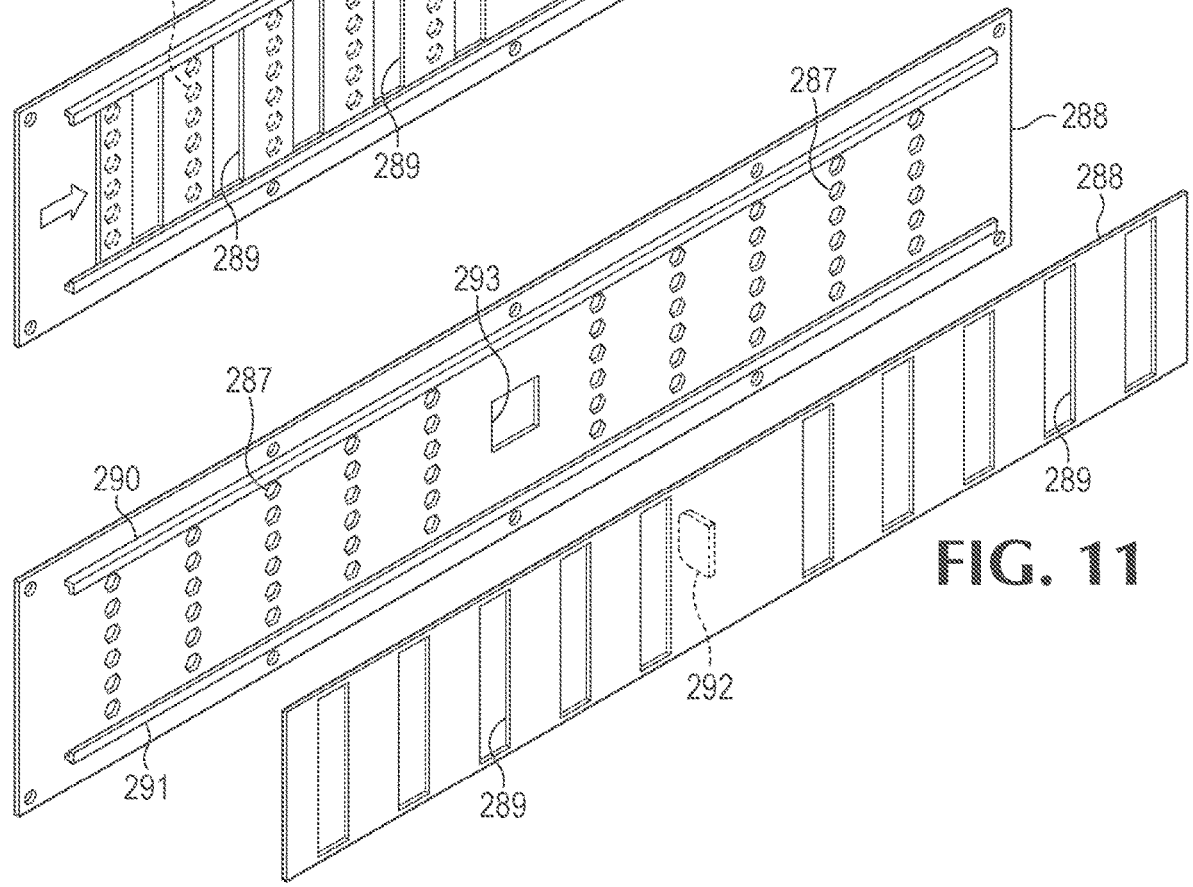
FIG. 11

TRANSPORTABLE BARBECUE GRILL

BACKGROUND

This disclosure relates to barbecue grills and barbecue systems.

Barbecues grills are typically used for outdoor grilling. Barbecue grills can be stored outdoors with a grill cover which may include waterproof and ultraviolet radiation protection, tear-resistant fabric, and tie-down accessories to extend the life of the barbecue grill and protect against weather or meteorological conditions.

Barbecue grills can be moveable by way of caster wheels, hand cart wheels, or other undriven wheels, which are typically made of molded plastic or rubber. These wheels are useful for moving the barbecue grill back and forth from storage in the garage to the patio, via a generally flat surface or paved path, but cannot be relied upon to facilitate moving the barbecue grill over longer distances and rougher terrain.

SUMMARY

An embodiment of a transportable barbecue grill includes a container having a rectangular cuboidal shape, a bottom surface, a pair of oppositely disposed sidewalls, a back panel disposed in perpendicular between the pair of oppositely disposed sidewalls, an elongate rail in vertical orientation to and in parallel alignment with a bearer. The elongate rail, cross-sectional surfaces of each of the pair of oppositely disposed sidewalls, and the bearer define an open face of the container. A cooking surface removably coupled adjacently atop of the container; at least one heating manifold disposed adjacently beneath the cooking surface within the container with the open face of the container capable of receiving the at least one heating manifold therethrough; a water chamber having a trapezoidal prism shape in which a top surface of the water chamber forms the bottom surface of the container are included. The water chamber includes a pair of oppositely disposed sidewalls, a bottom surface therebetween the oppositely disposed sidewalls, a back wall perpendicular to the bottom surface, and a front wall having a non-parallel relationship to the back wall with the non-parallel front wall extending upward in an obtuse angle from the bottom surface of the water chamber. Also included, a pair of Z-shaped legs each which are coupled to each one of the oppositely disposed sidewalls of the water chamber. The transportable barbecue grill can be transported by the use of a bucket coupled to a front loader attachable to a tractor. The bucket being correspondingly shaped to the water chamber and Z-shaped legs of the transportable barbecue grill in order to securely load a substantial portion of the transportable barbecue grill into the bucket.

BRIEF DESCRIPTION OF THE DRAWINGS

FIG. 10A is a rearward, elevational perspective view of a dampener of FIG. 9, featuring the vents in an open position;

FIG. 10B is a rearward, elevational perspective view of the dampener FIG. 10A, featuring the vents in a closed position;

FIG. 11 is a rearward, exploded perspective view of the dampener of FIGS. 10A and 10B, featuring a slider of the dampener;

Corresponding reference numerals indicate corresponding parts throughout the several views of the drawings.

Figure 1:
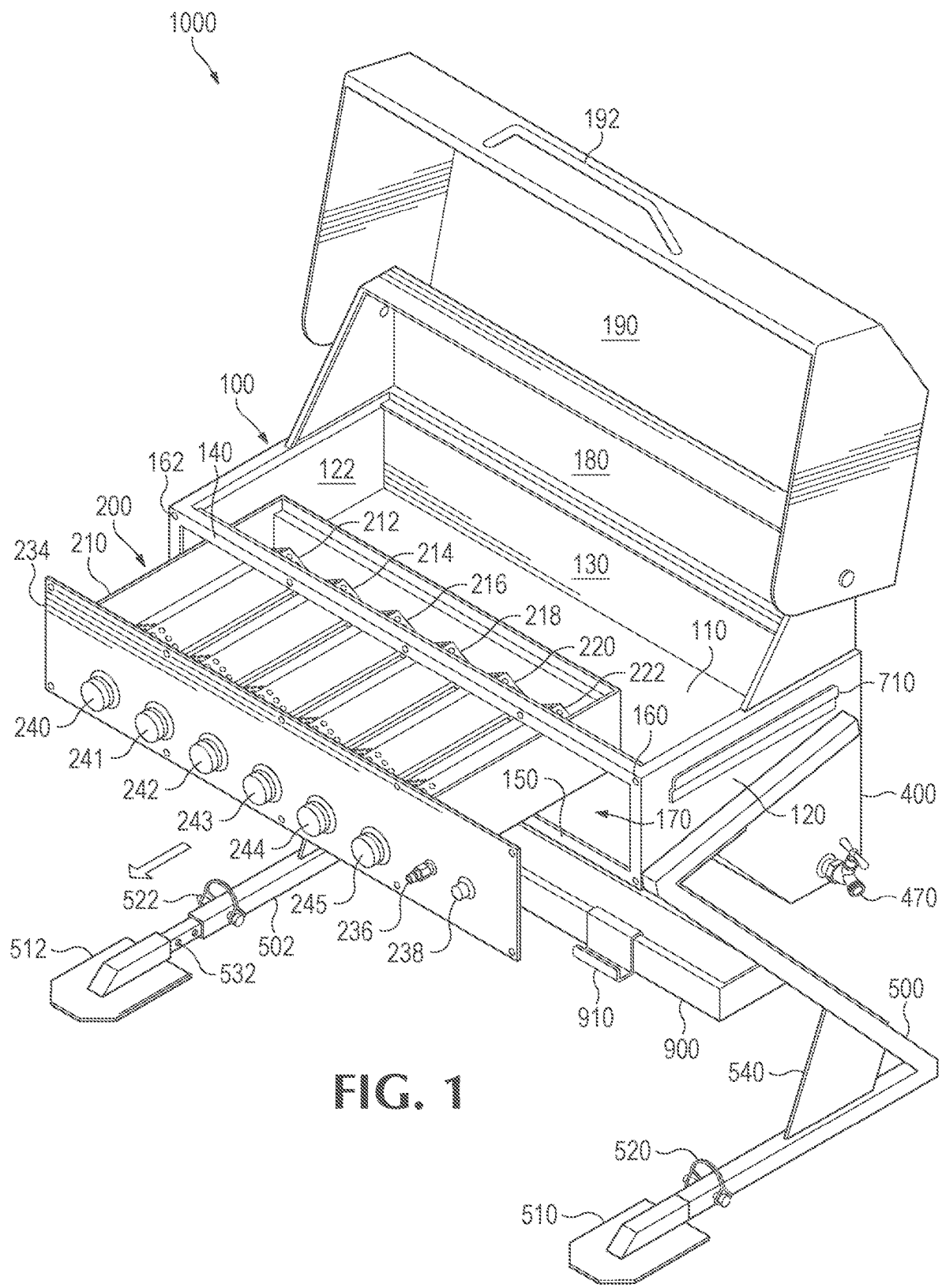
FIG. 1 is an elevational perspective view of a transportable barbecue grill, according to the present teachings.

The drawings described herein are for illustrative purposes only of select embodiments and not all possible implementations, and are not intended to limit the scope of the present disclosure.

DETAILED DESCRIPTION

With reference to the drawings as illustrated in FIGS. 1 through 17 a transportable barbecue grill embodying the principles and concepts of three main types of barbecues: gas grill barbecues, electric grill barbecues, and charcoal grill barbecues.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

With reference primarily to FIG. 1, a transportable barbecue grill or grill 1000 is depicted. The grill 1000 may be formed from durable stainless steel and powder coated construction.

Referring to FIG. 1-FIG. 4, grill 1000 includes container 100, at least one heating manifold 200, cooking surface 300, water chamber 400, and a pair of Z-shaped legs 500, 502 adapted to be received by a bucket 610 of a front loader attachment 600 of a tractor (not shown) for loading, hauling, and transporting the barbecue grill 1000.

With primarily continuing reference to FIG. 1, barbecue grill 1000 includes a container 100 having a rectangular cuboidal shape with a bottom surface 110, a pair of oppositely disposed sidewalls 120 and 122, and a back panel 130. The back panel 130 is disposed in perpendicular configuration between the pair of oppositely disposed sidewalls 120 and 122. An elongate rail 140 can be in a vertical orientation to and in parallel alignment with a bearer 150, forming, in combination with cross-sectional surfaces 160 and 162 of the pair of oppositely disposed sidewalls 120 and 122, an open face 170 of the container 100. A hood 180 can be coupled to the container 100 adjacently above the back panel 130. The grill 1000 includes a lid 190 rotatably coupled to the hood 180 and the lid 190 can include handle 192. A warming rack (not shown) may be hung under the hood 180 across the span of and adjacently above the container 100.

Figure 2:
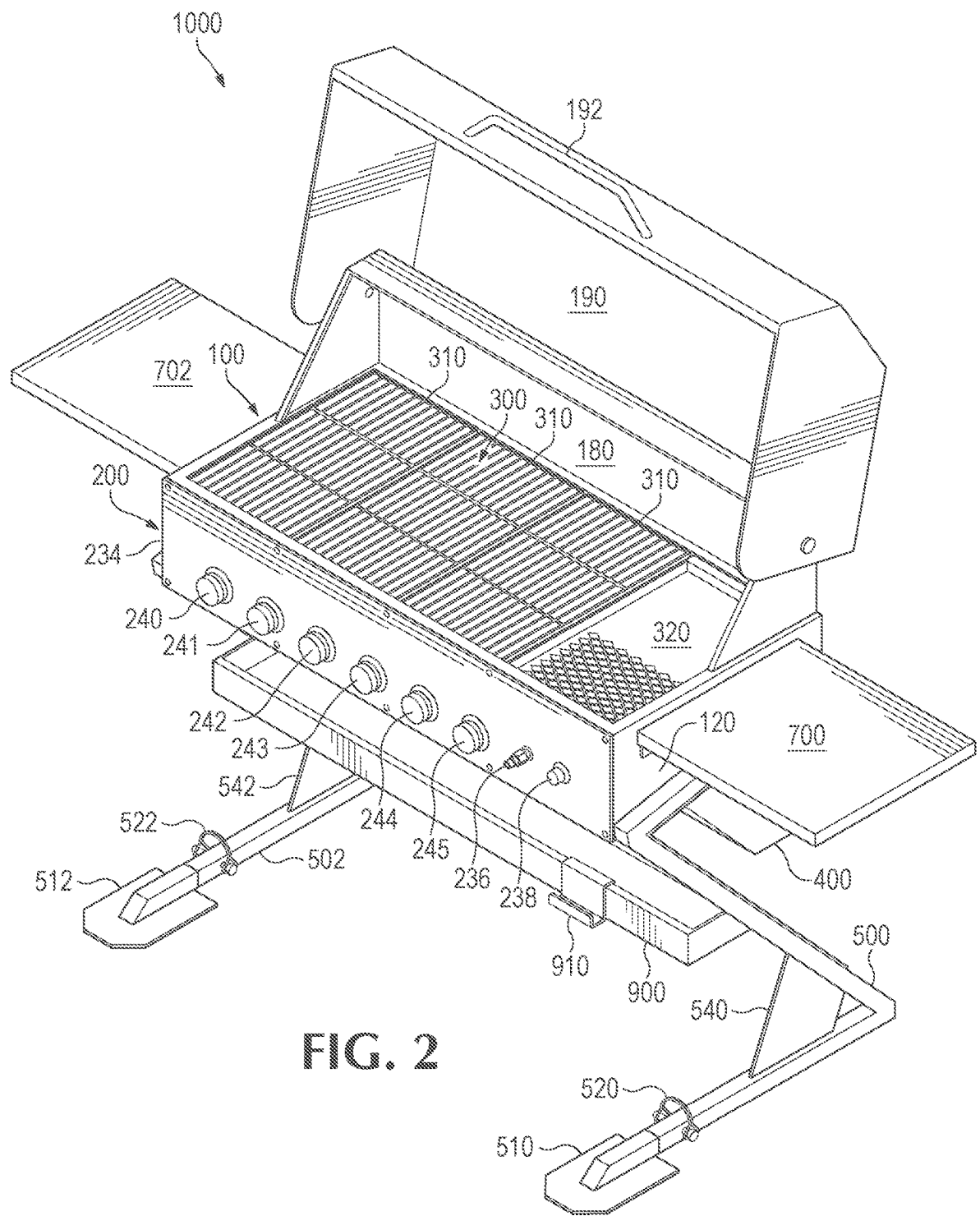
FIG. 2 is an elevational perspective view of the transportable barbecue grill of FIG. 1, featuring cooking surfaces and side shelves.
Figure 5:
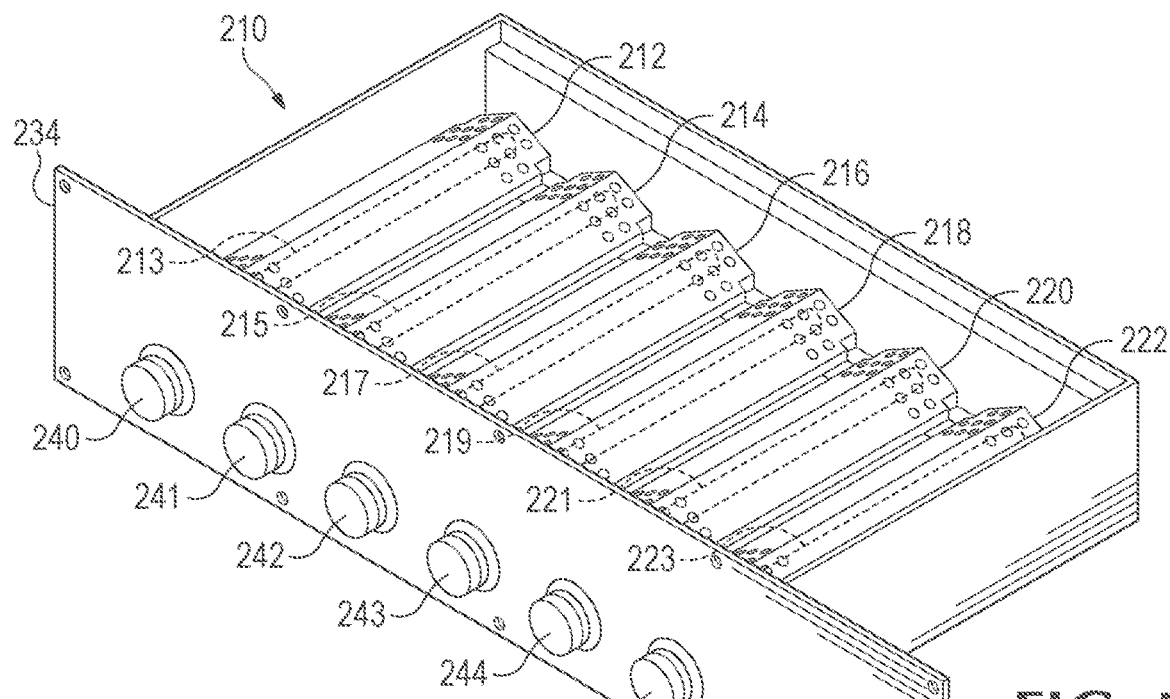
FIG. 5 is an elevational perspective view of a heating manifold, featuring flame burner elements, burner controllers, a gas inlet, and an igniter.

Referring to FIG. 1, FIG. 2, and FIG. 5, barbecue grill 1000 includes at least one heating manifold 200. In an embodiment, at least one heating manifold 200 can be a first heating manifold 210 which is selectively and removably received in the container 100 through the open face 170 of the container 100. The first heating manifold 210 provides a modular insert for cooking with gas, also known as propane or propane gas. A plurality of flame burner elements 213, 215, 217, 219, 221, 223 (see FIG. 5) can be operative to heat the cooking surface 300 from underneath. Each flame burner element 213, 2.15, 217, 219, 221, 223 can be covered over by a flame tamer 212, 214, 216, 218, 220, 222. First heating manifold 210 also includes a first face plate 234 having a gas inlet 236, an igniter 238, and a plurality of burner containers 240, 241, 242, 243, 244, 245. The first heating manifold 210 can be fastenably attachable to the perimeter of the open face 170 along the elongate rail 140, bearer 150, and cross-sectional surfaces 160 and 162 of the pair of oppositely disposed sidewalls 120 and 122.

As shown in FIG. 5, the flame tamers 212, 214, 216, 218, 220, 222 have a plurality of evenly spaced perforations, as vents and are mounted in an alternating arrangement directly above the flame burner elements 213, 215, 217, 219, 221, 223 underneath the cooking surface 300. Because of the indirect air flow paths to the cooking surface 300, heat is presented at a controlled and stable rate in combination with the use of any one of or more than one of the plurality of burner controllers. 240, 241, 242, 243, 244, 245.

Figure 6:
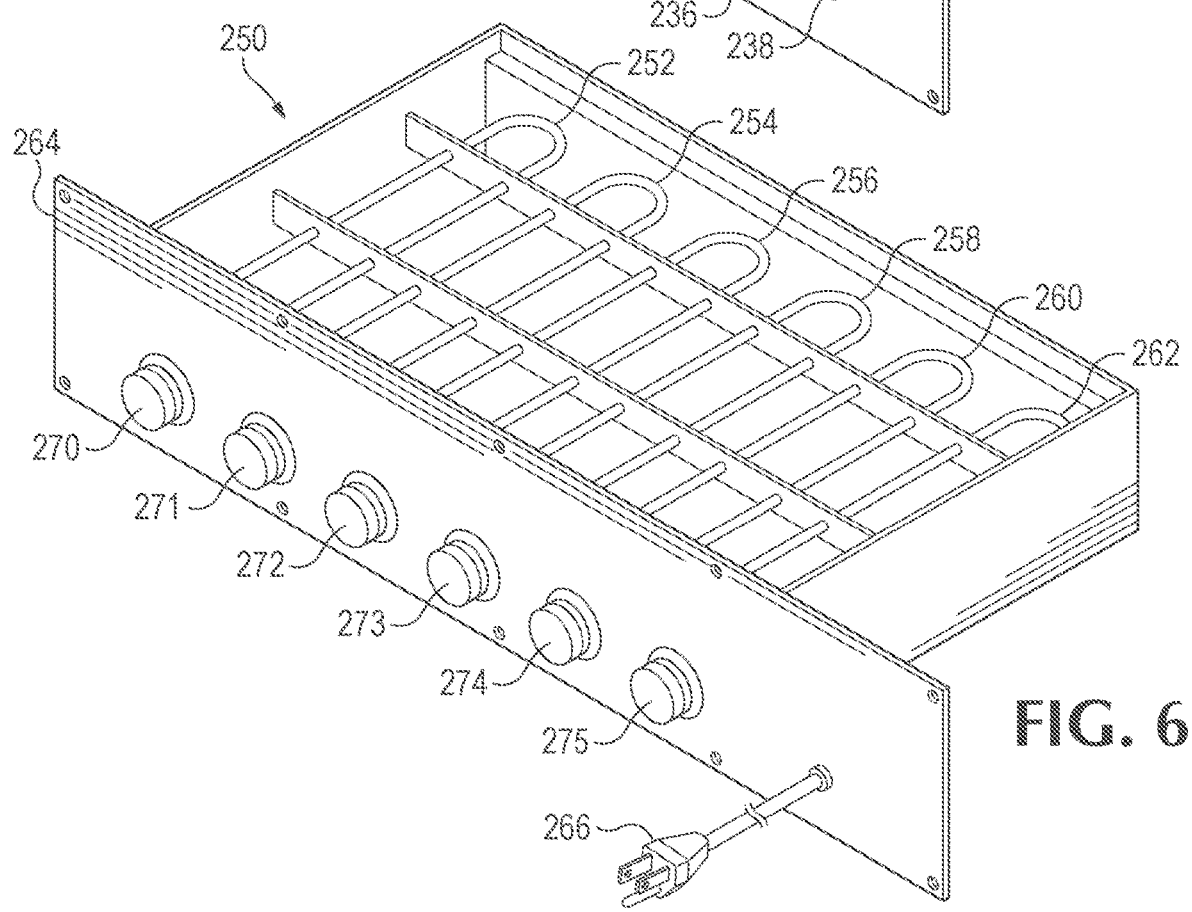
FIG. 6 is an elevational perspective view of a heating manifold, featuring electric burner elements and an electrical plug.
Figure 7:
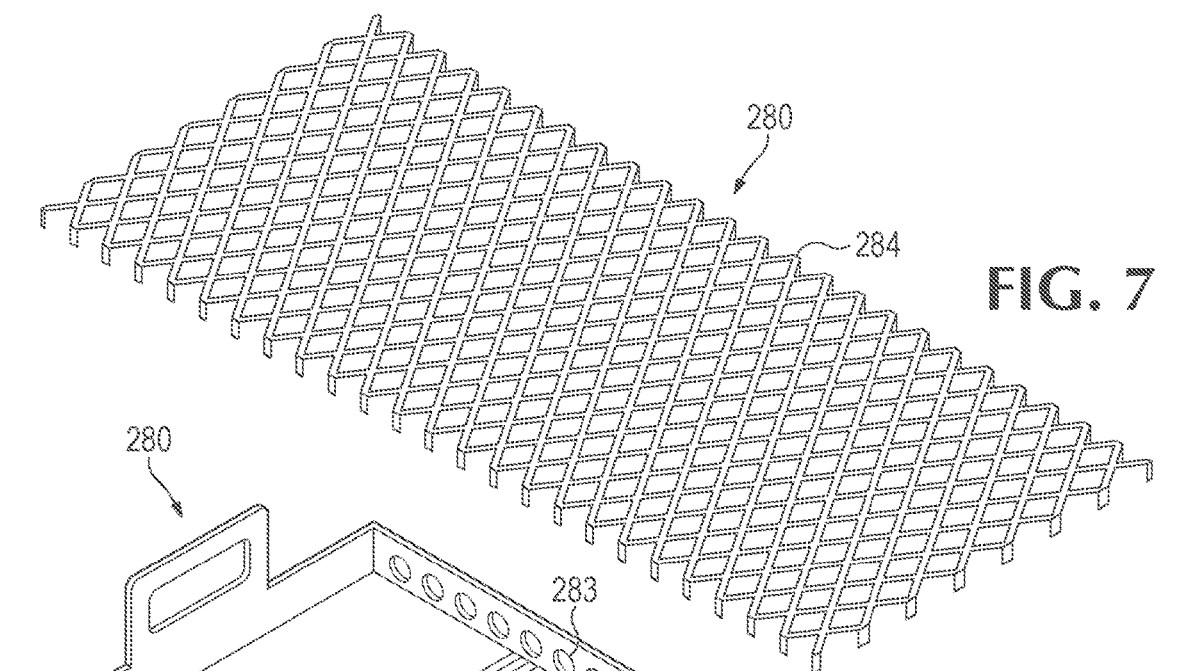
FIG. 7 is an elevational perspective view of a charcoal grate of a heating manifold.
Figure 8:
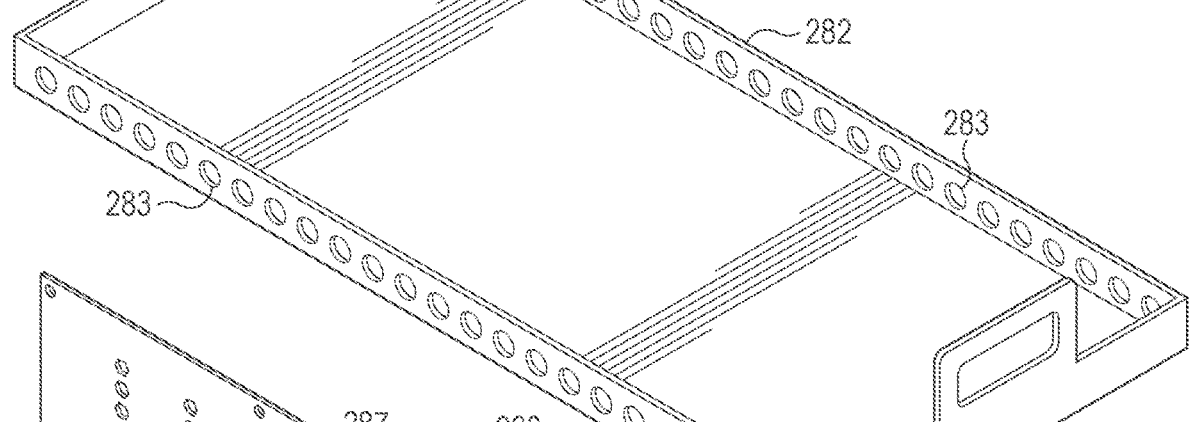
FIG. 8 is an elevational perspective view of a charcoal tray of a heating manifold.
Figure 9:
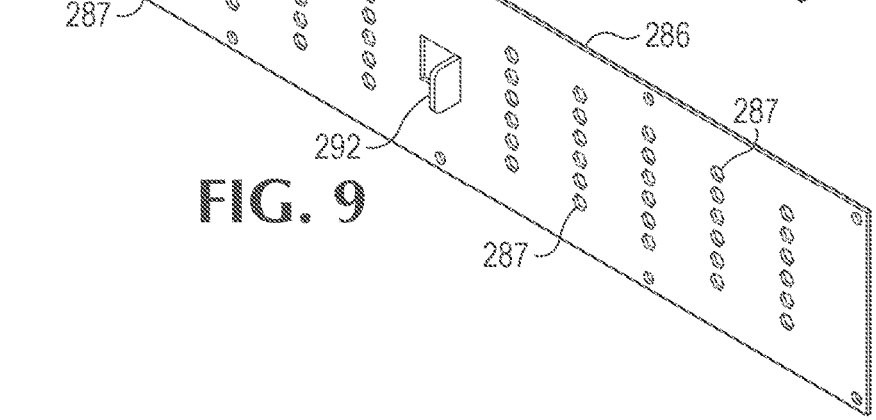
FIG. 9 is an elevational perspective view of a dampener of a heating manifold.

In an embodiment and with reference to FIG. 1, FIG. 2, and FIG. 6, the at least one heating manifold 210 can be a second heating manifold 250 selectively and removably received in the container 100 through the open face 170 of the container 100. The second heating manifold 250 includes a plurality of electric burner elements 252, 254, 256, 258, 260, 262 operative to heat the cooking surface 300 from underneath. The second heating manifold 250 includes a second face plate 264 and an electrical plug 266. The second heating manifold 210 can be fastenably attachable to the perimeter of the open face 170 along the elongate rail 140, bearer 150, and cross-sectional surfaces 160 and 162 of the pair of oppositely disposed sidewalls 120 and 122. A plurality of burner controllers 270, 271, 272, 273, 274, 275 enable the selection of the rates of heat with use of the electric burner elements 252, 254, 256, 258, 260, 262.

Referring to FIG. 1, FIG. 2, and FIG. 7-FIG. 11, the at least one heating manifold 210 can be a third heating manifold MO selectively and removably received in the container 100 through the open face 170 of the container 100. The third heating manifold 210 includes a charcoal tray 282 adjacently beneath a charcoal grate 284. The charcoal tray can include a plurality of air flow openings 283, as vents along the longitudinal walls of the tray 282. The charcoal grate 284 can include charcoal (not shown) thereon to heat the cooking surface 300 from underneath within the container 100. A fastenably attachable dampener 286 having a plurality of air flow openings 287, formed therein can be used to control air flow from an area immediately outside the dampener 288. The plurality of air flow openings 287 can be selectively opened and closed for more or less air flow and ventilation via the dampener 286 having a slider 288 on rails 290, 291. The slider 288 can incorporate slots 289 to selectively block (dampener 286 in the closed position) air flow, or the slots 289 can be selectively shifted to leave the plurality of air flow openings 287 unobstructed (dampener 286 in open position), or the slots 289 can be shifted to partially obstruct the plurality of air flow openings 287, regulating the air flow (see FIGS. 10A and 10B). The dampener 286 can include a selector hole 293 for receiving a dampener selector 292 coupled to the slider 288 (see FIG. 11).

The illustrative and commercially available examples of the at least one heating manifold 200 of the transportable barbecue grill 1000 are not intended to preclude embodiments which incorporate similar or equivalent modular and selectively exchangeable heating systems, currently or prospectively available.

Figure 12:
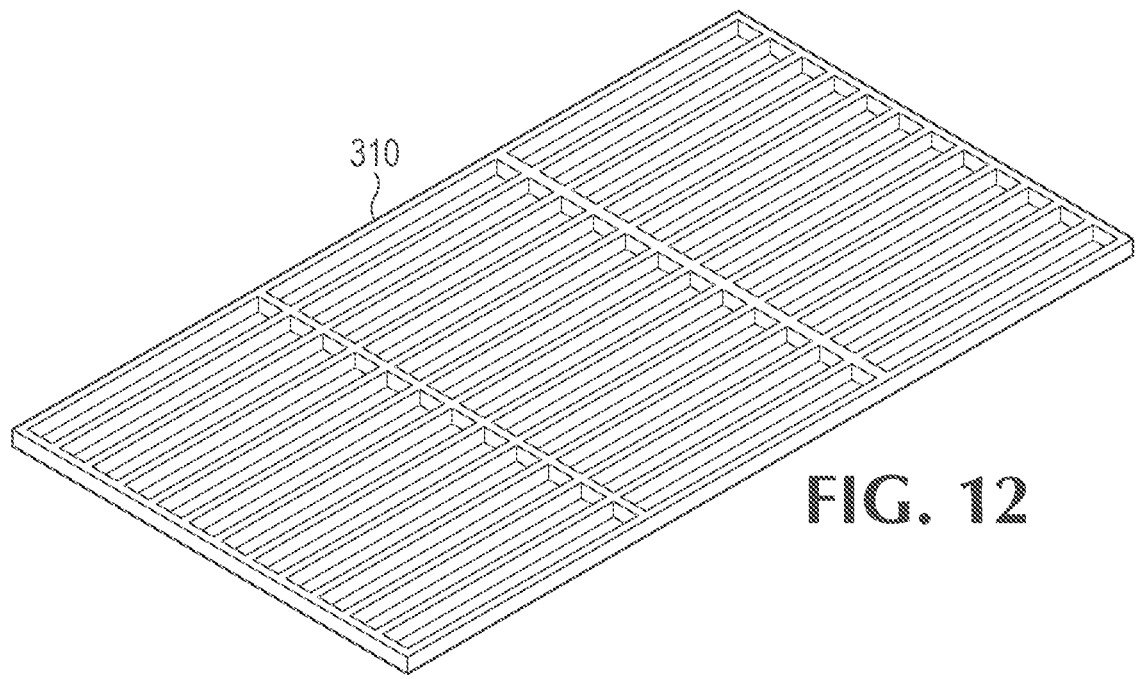
FIG. 12 is an elevational perspective view of a cooking surface.
Figure 13:
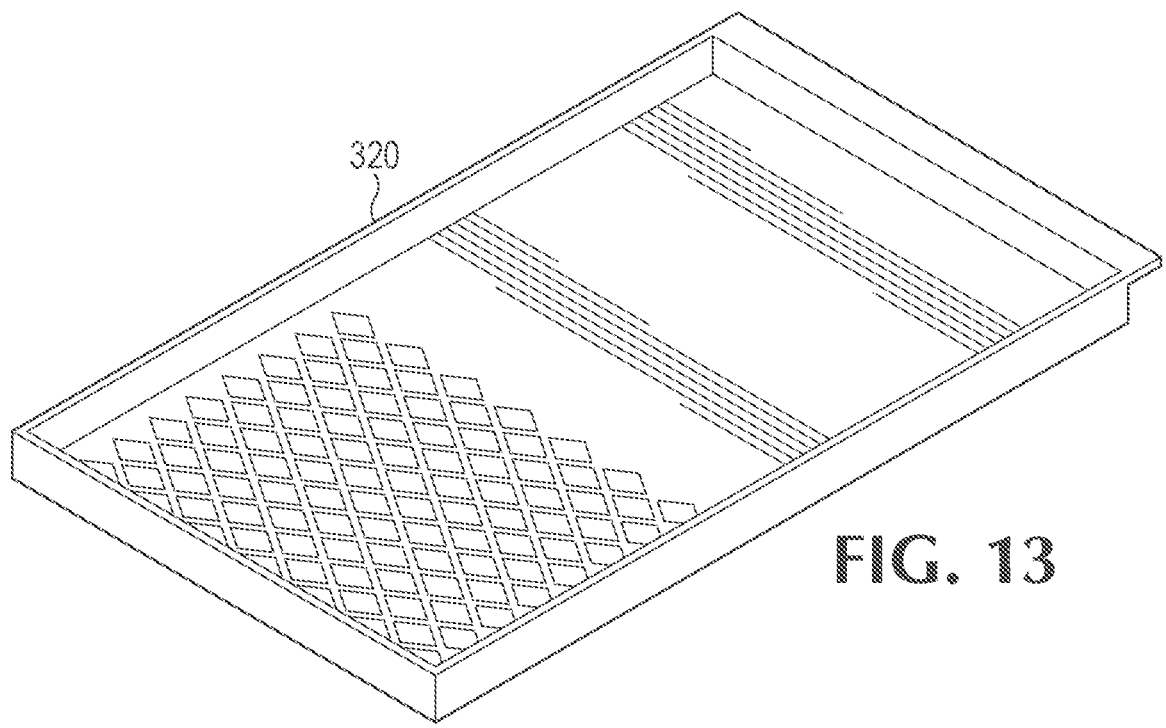
FIG. 13 is an elevational perspective view of a cooking surface.
Figure 14:
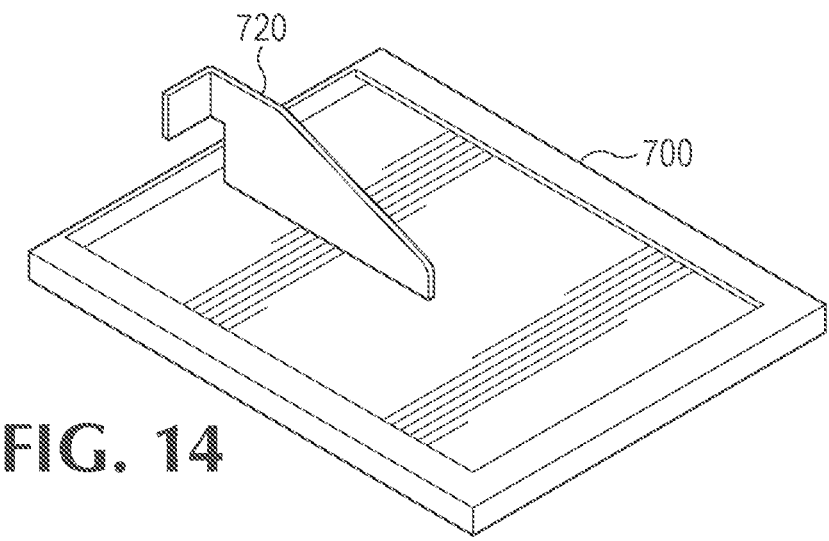
FIG. 14 is an underside, elevational perspective view of a grill side shelf.
Figure 15:
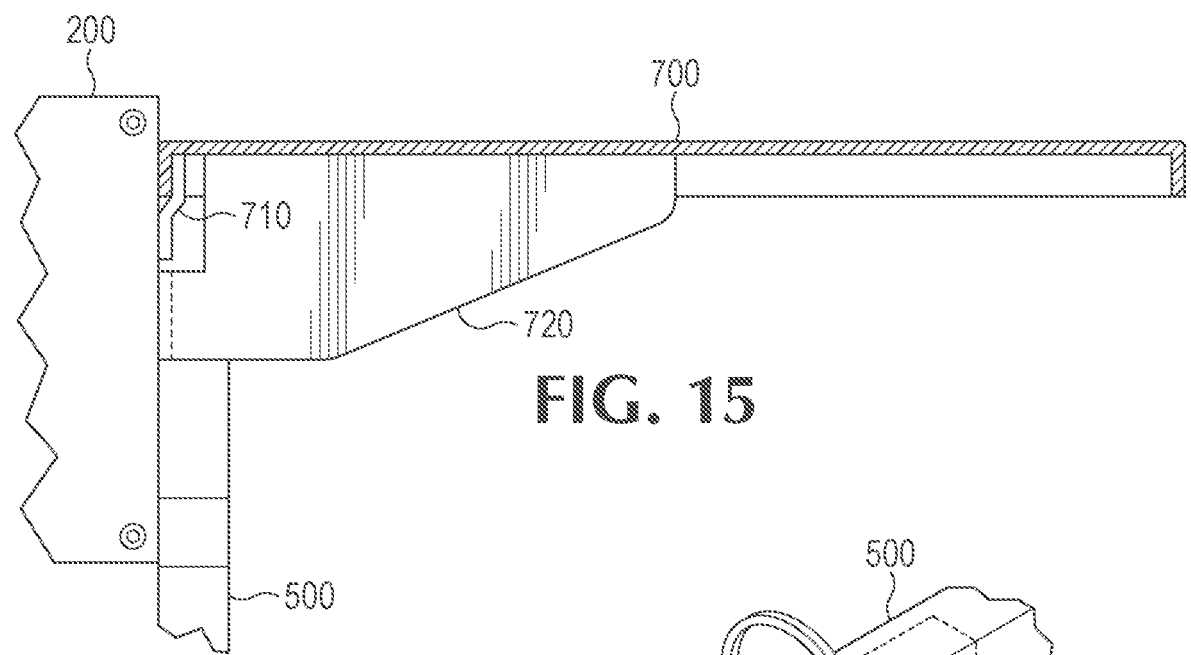
FIG. 15 is a front side view of a grill side shelf outwardly deployed.
Figure 16:
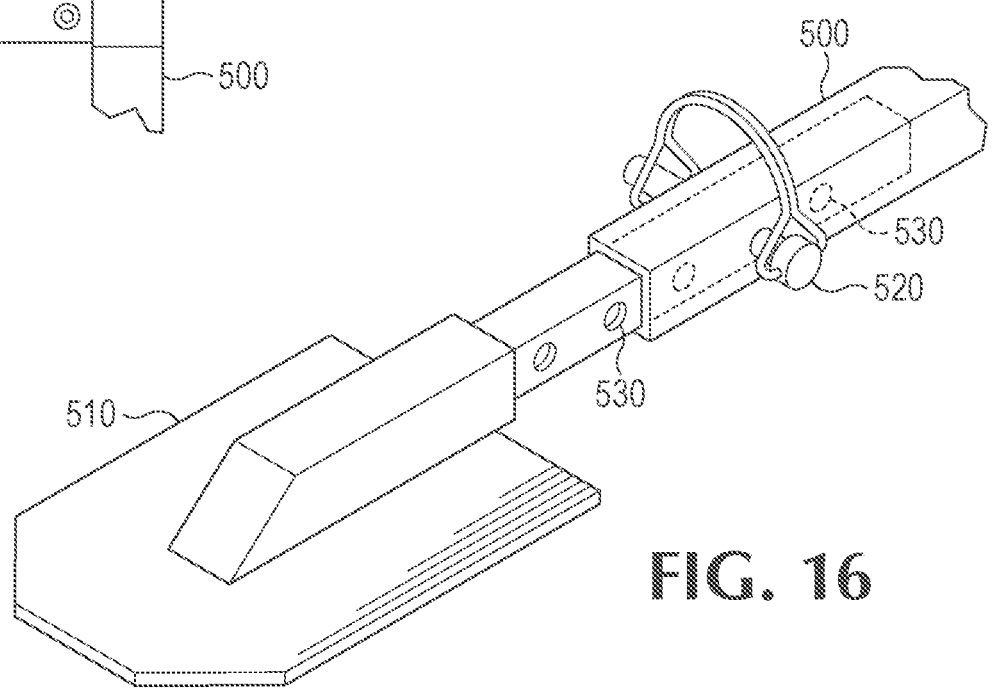
FIG. 16 is an elevational perspective view of an extendable foot of a Z-shaped leg of the transportable barbecue grill.
Figure 17:
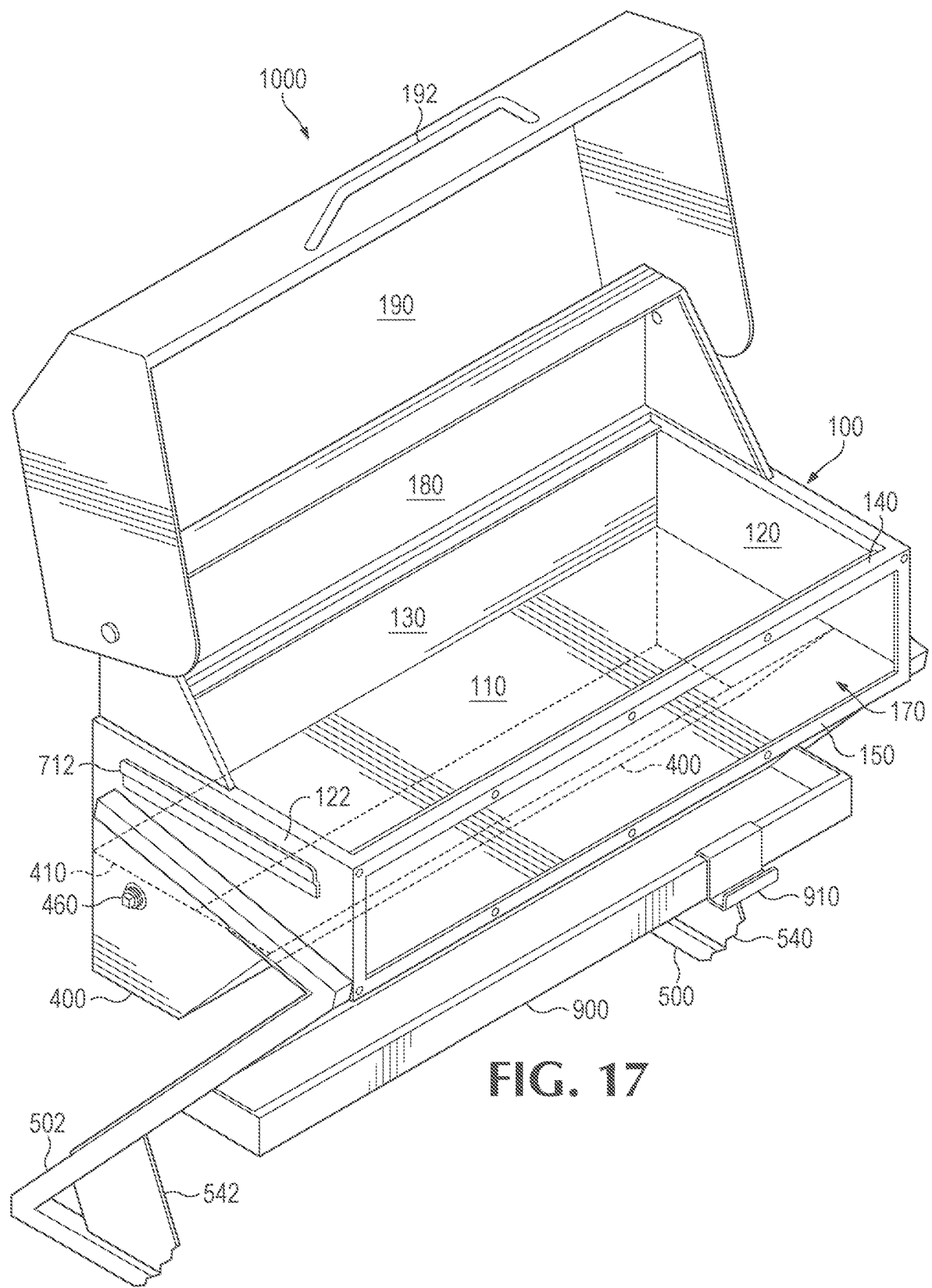
FIG. 17 is an elevational perspective view of the transportable barbecue grill, featuring a water chamber.

Referring to FIG. 2, and FIG. 12-FIG. 13, the barbecue grill 1000 includes cooking surface 300. The cooking surface 300 can be at least one cooking grid 310 or at least one partially perforated plate 320 having a length extending between either the pair of oppositely disposed sidewalls 120 and 121 or a width extending between the elongate rail 140 and the back panel 130. The at least one cooking grid 310 and the at least one perforated plate 320 can each be selectively and removably disposed within the container 100 forming a planar surface substantially flush with at least a partial perimeter of the container 100.

The illustrative and commercially available examples of the cooking surface 300 of the transportable barbecue grill 1000 are not intended to preclude embodiments which incorporate similar or equivalent selectively removable and replaceable grates, grids, plates, or cooktops, currently or prospectively available.

As shown in FIG. 1-FIG. 4, and FIG. 17 water chamber 400 includes a trapezoidal prism shape in which a top surface 410 of the water chamber forms the bottom surface 110 of the container 100 (see FIG. 17) The water chamber 400 includes a pair of oppositely disposed sidewalls 420 and 422, a bottom surface 430 therebetween the oppositely disposed sidewalls 420 and 422, a back wall 440 perpendicular to the bottom surface 430, and a non-parallel (in relationship to the back wall 440) front wall 450. The non-parallel front wall 450 can extend upward in an obtuse angle from the bottom surface 430 of the water chamber 400. Water chamber 400 can include a fill port 460 and spigot 470 disposed in sidewalls 420 and 422 and can be filled with potable water for washing hands and drinking.

With reference to FIG. 1-FIG. 4, and FIG. 16-FIG. 17, the transportable barbecue grill 1000 includes a pair of Z-shaped legs 500 and 502 and a pair of feet 510 and 512 selectively extendable in a direction away from the water chamber 400 and each foot of the pair of feet 510 and 512 selectively lockable with a push-pull pin type lock and leash 520 and 522. The push-pull pin locks with leash 520 and 522 are removably attachable to the Z-shaped legs 500 and 502 via a plurality of holes 530 and 532 disposed therethrough each of the Z-shaped legs 500 and 502. The Z-shaped legs 500 and 502 are further strengthened by supports 540 and 542.

With primarily continuing reference to FIG. 1-FIG. 4, and FIG. 16-FIG. 17, the Z-shaped legs 500 and 502 can be coupled to each one of the oppositely disposed sidewalls 120 and 122 and, in combination with the water chamber 400, are designed to be capable of being loaded by a bucket 610 coupled to a front loader 600, which can be detached and reattached to a tractor or tractor frame. The water chamber 400 and Z-shaped legs 500 and 502 of the transportable barbecue grill MOO can be correspondingly shaped to receive the bucket 610 to in order to securely load a substantial portion of the transportable barbecue grill 1000 into the bucket 610.

The illustrative and commercially available examples of the front loader 600 and bucket 610 of the transportable barbecue grill 1000 are not intended to preclude embodiments which incorporate similar or equivalent sized, shaped, and dimensioned buckets 610 currently or prospectively available.

In an embodiment, a hydraulic control unit (not shown) as part of the operation of the front loader 600 of the tractor can be used as an electronic controller to open and close the lid 190.

In an embodiment an electronic controller (not shown) can employ a microcontroller constructed from at least printed circuit boards/integrated circuits and microprocessors and can include high heat construction design, specialized adhesive construction, loop resistant circuitry or electrostatic design, electromagnetic interference, or radio frequency interference shielding into the design. The electronic controller can provide functionality such as the ability to program or select temperature settings, setting cooking times, single- or multi-burner operation, or timed on/off control. Other functionality could be added such as the ability to have multi-function operation, temperature zone control, set temperature control, for example.

Referring to FIG. 1-FIG. 4, FIGS. 14-15, and FIG. 17, the transportable barbecue grill 1000 can include a pair of utility shelves 700 and 702 each removably attachable as outwardly extendable from each of the pair of oppositely disposed sidewalls 120 and 122, The utility shelves 700 and 702 include a pair of catches 710 and 712 coupled to each of the pair of oppositely disposed sidewalls 120 and 122. Fin 720 allows utility shelf 700 to be removably attachable to catch 710. An additional fin (not shown) for utility shelf 702 and catch 712 can be configured the same or similar to the setup of fin 720 with utility shelf 700 and catch 710.

Figure 3:
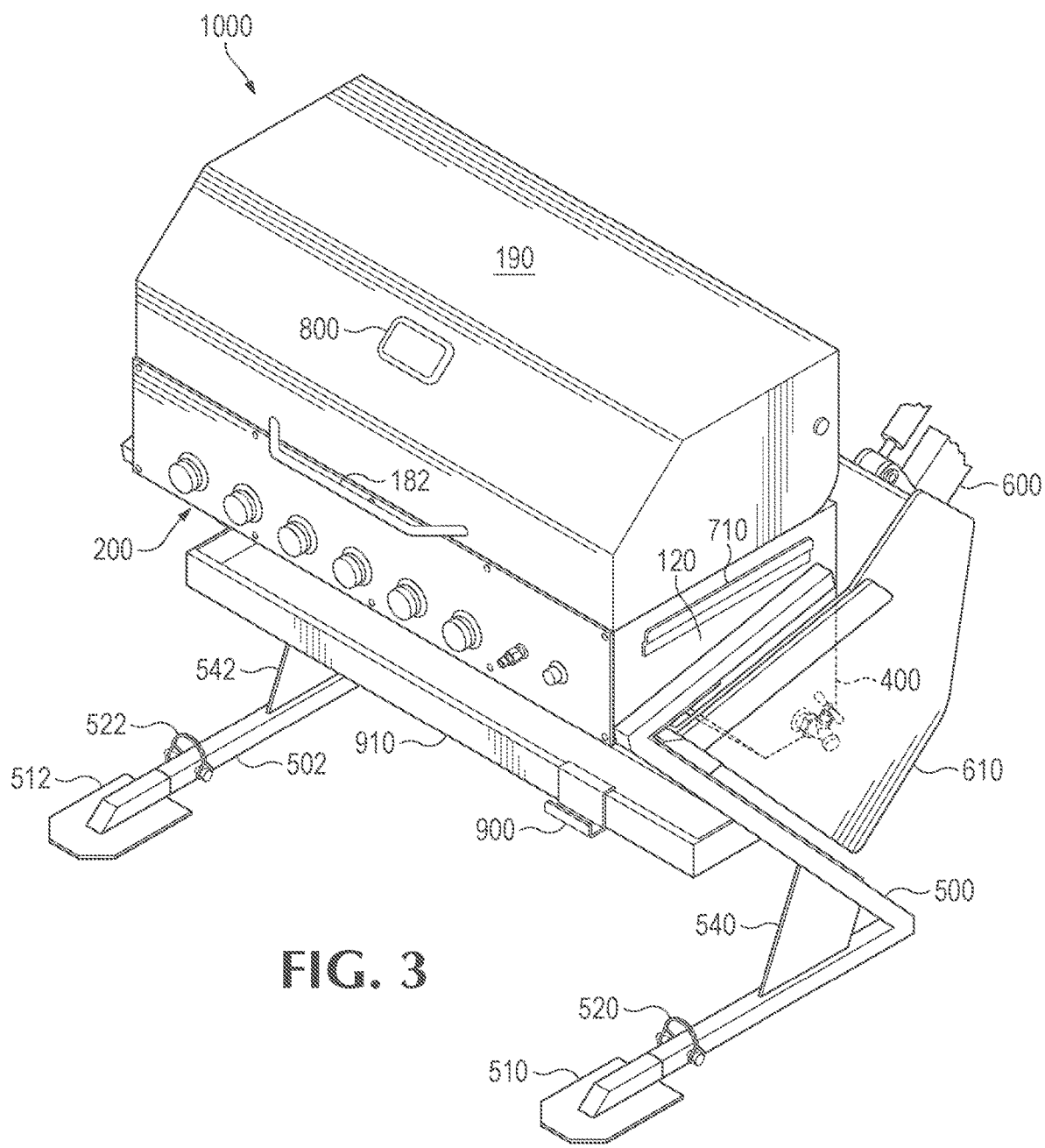
FIG. 3 is an elevational perspective view of the transportable barbecue grill, featuring a front loader attachment with bucket.
Figure 4:
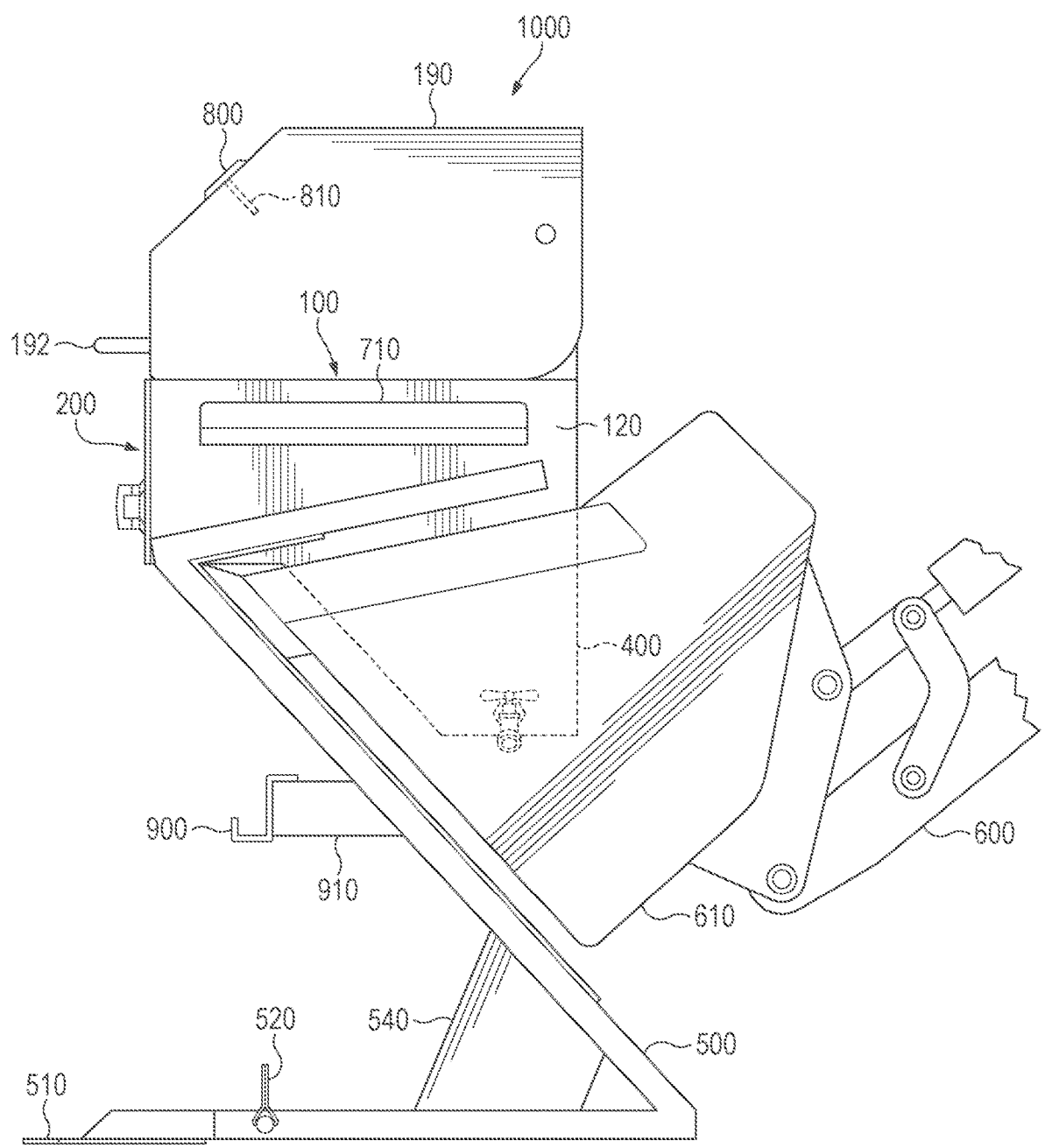
FIG. 4 is a left side view of the transportable barbecue grill of FIG. 3.

With primarily continuing reference to FIG. 3 and FIG. 4, thermometer 800 having a stem 810, as a sensor can be disposed through a surface of the lid 190 in a readily readable position, in order to measure the temperature of the heat contained in the cooking enclosure formed within the container 100, hood 180, and lid 190 when the lid 190 is closed.

The illustrative and commercially available examples of the thermometer 800 of the transportable barbecue grill 1000 are not intended to preclude embodiments which incorporate similar or equivalent temperature measurement devices including resistance temperature detectors, thermistors, integrated circuit sensors, radiation sensors, infrared, and thermocouples.

Referring to FIG. 1-FIG. 4 and FIG. 17, utility shelf 900 and propane tank hanger 910 are provided.

The present teachings thus advantageously provide for a transportable barbecue grill 1000. The present teachings provide for numerous other advantages as well, as will be recognized by one skilled in the art.

The description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, quadrants, thirds, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 routes refers to groups having 1, 2, or 3 routes. Similarly, a group having 1-5 impact zones refers to groups having 1, 2, 3, 4, or 5 impact zones and more or less, and so forth.

The construction and arrangement of the structures and systems as shown in the various exemplary embodiments are illustrative only. Although only a few embodiments have been described in detail, many modifications are possible (e.g., variations in sizes, dimensions, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A transportable barbecue grill, comprising:
   a container having a rectangular cuboidal shape, comprising a bottom surface, a pair of oppositely disposed sidewalls, a back panel disposed in perpendicular between the pair of oppositely disposed sidewalls, an elongate rail in vertical orientation to and in parallel alignment with a bearer, wherein the elongate rail, cross-sectional surfaces of each of the pair of oppositely disposed sidewalls, and the bearer define an open face of the container;
   a cooking surface removably coupled adjacently atop of the container;
   at least one heating manifold disposed adjacently beneath the cooking surface within the container, the open face of the container capable of receiving the at least one heating manifold therethrough;
   a water chamber having a trapezoidal prism shape in which a top surface of the water chamber forms the bottom surface of the container, wherein the water chamber comprises a pair of oppositely disposed sidewalls, a bottom surface therebetween the oppositely disposed sidewalls, a back wall perpendicular to the bottom surface, and a front wall non-parallel in relationship to the back wall, the non-parallel front wall extending upward in an obtuse angle from the bottom surface of the water chamber;

a pair of Z-shaped legs each coupled to each one of the oppositely disposed sidewalls of the water chamber, wherein the transportable barbecue grill capable of being transported by a bucket coupled to a front loader attachable to a tractor, the water chamber and Z-shaped legs correspondingly shaped to the bucket of the front loader in order to securely support at least a substantial portion of the transportable barbecue grill as a load for hauling and transporting.

2. The transportable barbecue grill of claim 1, wherein the at least one heating manifold comprises a first heating manifold selectively and removably received in the container through the open face of the container, the first heating manifold comprising a plurality of flame burner elements operative to heat the cooking surface from underneath, the first heating manifold further comprising a first face plate having a gas inlet, an igniter, a plurality of burner controllers, and a plurality of flame tamers disposed over each of the plurality of flame burner elements.

3. The transportable barbecue grill of claim 1, wherein the at least one heating manifold comprises a second heating manifold selectively and removably received in the container through the open face of the container, the second heating manifold comprising a plurality of electric burner elements operative to heat the cooking surface from underneath, the second heating manifold further comprising a second face plate and an electrical plug.

4. The transportable barbecue grill of claim 1, wherein the at least one heating manifold comprises a third heating manifold selectively and removably received in the container through the open face of the container, the third heating manifold comprising a charcoal tray adjacently beneath a charcoal grate, the charcoal grate comprising charcoal thereon to heat the cooking surface from underneath.

5. The transportable barbecue grill of claim 4, wherein the third heating manifold further comprises a fastenably attachable dampener having a plurality of openings formed therein to control air flow from an area immediately outside the dampener.

6. The transportable barbecue grill of claim 1, wherein the cooking surface comprises at least one cooking grid or at least one perforated plate having a length extending between either the pair of oppositely disposed sidewalls or a width extending between the elongate rail and the back panel, the at least one cooking grid and the at least one perforated plate each selectively and removably disposed within the container forming a planar surface substantially flush with at least a partial perimeter of the container.

7. The transportable barbecue grill of claim 1, wherein the Z-shaped legs each comprise a foot, each foot extendable in a direction away from the water chamber.

8. The transportable barbecue grill of claim 7, wherein the Z-shaped legs each comprise a push-pull pin to lock each foot.

9. The transportable barbecue grill of claim 1, comprising a hood coupled to the container adjacently above the back panel.

10. The transportable barbecue grill of claim 1, comprising a lid rotatably coupled to the hood.

11. The transportable barbecue grill of claim 1, comprising a pair of utility shelves each removably attachable as outwardly extendable from each of the pair of oppositely disposed sidewalls.

12. The transportable barbecue grill of claim 6, wherein the cooking surface comprises a plurality of openings formed therein to allow the passage of heated air through the cooking surface.

13. The transportable barbecue grill of claim 1, comprising a thermometer disposed through a surface of the lid and readable from the outside of the lid.

* * * * *